Dec. 4, 1951     J. L. CHANCE     2,577,676
ATTACHABLE HANDLE FOR PANS
Filed Jan. 12, 1950
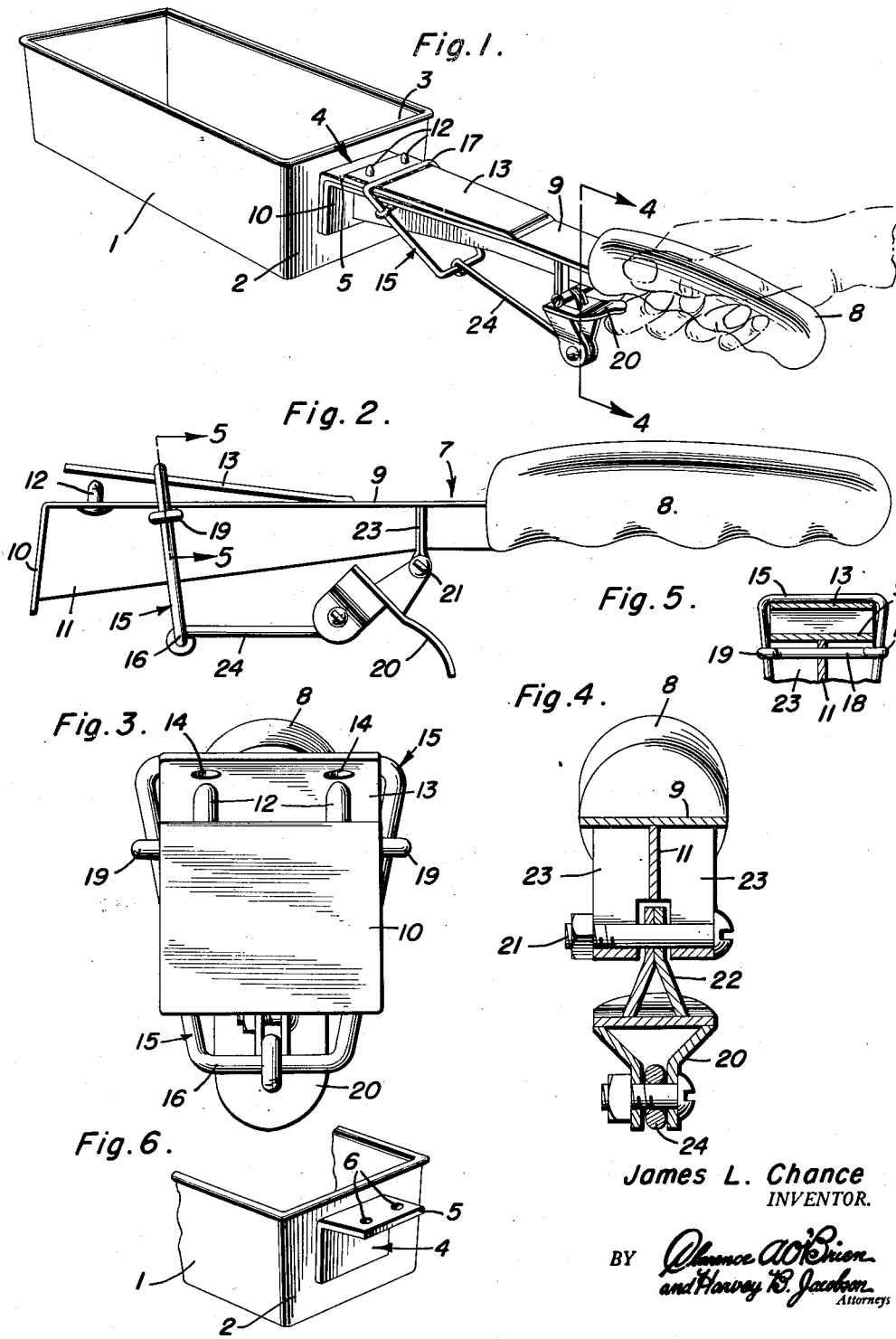
James L. Chance
INVENTOR.

Patented Dec. 4, 1951

2,577,676

UNITED STATES PATENT OFFICE 2,577,676

ATTACHABLE HANDLE FOR PANS

James L. Chance, Chester, Md., assignor of fifty per cent to Wesley E. Thawley, Denton, Md.

Application January 12, 1950, Serial No. 138,158

3 Claims. (Cl. 16—114)

My invention relates to improvements in attachable handles for pans and the like.

The primary object of the invention is to provide a quick attachable and detachable handle for attachment to pans below the rim so that removing the cover of a pan is not necessary in order to attach or detach the handle.

Another object is to provide a handle for the purpose above set forth which is easy to attach and detach, simple in construction, and comparatively inexpensive to manufacture.

Other and subordinate objects, within the purview of my invention, together with the precise nature of my improvements will be readily understood when the succeeding description and claims are read with reference to the drawing accompanying and forming part of this specification.

In said drawing:

Figure 1 is a view in perspective of my invention in the preferred embodiment thereof showing the handle attached;

Figure 2 is a view in side elevation of the handle drawn to a larger scale;

Figure 3 is a view in front end elevation drawn to a still larger scale;

Figure 4 is a view in vertical transverse section taken on the line 4—4 of Figure 1 and drawn to a larger scale;

Figure 5 is a view in vertical transverse section taken on line 5—5 of Figure 2;

Figure 6 is a fragmentary view in perspective illustrating in detail the bracket attached to the pan.

Referring to the drawing by numerals, according to my invention, the conventional pan, for instance, a bread pan 1, is provided on one end thereof, below the rim 3, with an angle bracket 4 forming an outstanding horizontal ledge 5 on said pan. The ledge 5 is formed with a pair of apertures 6 therein spaced apart crosswise of the pan 1. The bracket 4 may be fixed in any suitable manner to the pan 1 and, as will presently more clearly appear, forms an attaching member for a handle 7.

The handle 7 comprises an elongated hand grip member 8 curved and notched to fit the hand member and the fingers and from one end of which a shank 9 extends and is suitably fixed to the hand grip member 8, in a manner not shown.

The shank 9 is of flat, rigid material adapted to fit at its front end under the ledge 5 and is formed with a down-turned front end lip 10 for fitting against the bracket 4 under said ledge. A longitudinal, central reinforcing web 11 on the bottom of the shank 9 strengthens the same. A pair of top studs 12 spaced apart laterally on the shank 9 adjacent the front end thereof are provided for fitting upwardly in the apertures 6 for coaction with the lip 10 to hold the pan 1 up when the handle 7 is attached and said pan lifted by said handle.

Means are provided on the handle 7 for coaction with the studs 12 to lock said handle 7 to the ledge 4 and which will now be described. An upwardly flexing leaf spring 13 is suitably fixed on top of the shank 9 to extend along the same with a front end overlying the studs 12 and provided with a pair of laterally spaced apertures 14 for encircling said studs 12 when the leaf spring 13 is flexed downwardly flat against the shank 9.

An elongated, spring depressing lever 15, of wire loop form, surrounds the shank 9 and the leaf spring 13, and is pivotally mounted on the shank 9 for swinging thereon when the lower end 16 of the lever is pulled rearwardly to swing the upper end 17 down against the leaf spring 13 for depressing said spring. For pivotally mounting said lever 15, a rod 18 is journalled in the rib 11 and with end eyes 19 in which the sides of said lever 15 are suitably fixed.

For swinging the spring depressing lever 15, a finger operative lever 20 is pivoted to the shank 9 below the same and between said lever 15 and the hand grip member 8 and by means of a bolt 21 passing through an ear 22 on said lever 15 and through a pair of ears 23 depending from the shank 9. A pull rod 24 operatively connects the finger lever 20 to the lower end 16 of said lever 15.

Referring now to the use and operation of my invention, the leaf spring 13 normally flexes upwardly into spaced relation to the shank 9 and studs 12 and yieldingly maintains the spring depressing lever 15, finger operative lever 20 and pull rod 24 in normal position. To attach the handle 7, the front end portion of the shank 9 and the lip 10 are inserted forwardly and upwardly under the ledge 5 against the bracket 4 to extend the studs 12 upwardly through the apertures 6. The finger of the hand grasping the hand grip member 8 is then used to exert pull on the finger operative lever 20, with the result that the spring depressing lever 15 will be swung in a direction to depress the leaf spring 13 flat against the shank 9 with the studs 12 extended through the apertures 14 in said spring. Thus, the ledge 5 is clamped between the shank 9 and said spring 13 with the lip 10 against the bracket 4 so that the pan 1 may be lifted, or otherwise manipulated, as desired, by the handle 8. Upon release of the finger operative lever 20, the leaf spring 13 will react upwardly clear of the studs 12 so that the shank 9 may be moved downwardly of the bracket 4 to withdraw the studs out of the apertures 6 so that the handle 7 may be detached and removed, when desired.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claims.

Having described the invention, what is claimed as new is:

1. A handle for attachment to a side ledge fixed to a pan and having a pair of apertures, said handle comprising a shank, a flat leaf spring on said shank reacting away from said shank to provide for placing said shank and spring into straddling relation to said ledge, said spring being flexible toward said shank into clamping relation thereto to grip the ledge between the same and said spring, studs on said shank adapted for insertion through said apertures, said spring having apertures therein for receiving said studs in the clamping relation of the shank and spring for locking said handle to said ledge, and manipulative means on said handle for flexing said spring toward said shank comprising a pivoted member on the shank for swinging against said spring, and a pivoted finger operative member on said shank beneath the same for swinging said member.

2. A handle for attachment to a side ledge fixed to a pan and having a pair of apertures, said handle comprising a shank, a flat leaf spring on said shank reacting away from said shank to provide for placing said shank and spring into straddling relation to said ledge, said spring being flexible toward said shank into clamping relation thereto to grip the ledge between the same and said spring, studs on said shank adapted for insertion through said apertures, said spring having apertures therein for receiving said studs in the clamping relation of the shank and spring for locking said handle to said ledge, and manipulative means on said handle for flexing said spring toward said shank comprising a loop member surrounding said shank and spring and pivoted on the shank for swinging against said spring, and a pivoted finger operative lever on said shank for swinging said member.

3. A handle for attachment to a side ledge fixed to a pan and having a pair of apertures, said handle comprising a shank, a flat leaf spring on said shank reacting away from said shank to provide for placing said shank and spring into straddling relation to said ledge, said spring being flexible toward said shank into clamping relation thereto to grip the ledge between the same and said spring, studs on said shank adapted for insertion through said apertures, said spring having apertures therein for receiving said studs in the clamping relation of the shank and spring for locking said handle to said ledge, and manipulative means on said handle for flexing said spring toward said shank comprising a pivoted member on said shank swinging against said spring, a pivoted finger operative member on said shank beneath the same, and pull rod operatively connecting said members.

JAMES L. CHANCE.

REFERENCES CITED

The following references are of record in the file of this patent:

UNITED STATES PATENTS

| Number | Name | Date |
|---|---|---|
| 606,904 | Tubbs | July 5, 1898 |
| 840,650 | Ortt | Jan. 8, 1907 |
| 1,364,552 | Hill, Jr. | Jan. 4, 1921 |
| 2,069,523 | Gilbert | Feb. 2, 1937 |
| 2,220,879 | Hayden et al. | Nov. 12, 1940 |
| 2,358,565 | Dunlap | Sept. 19, 1944 |

FOREIGN PATENTS

| Number | Country | Date |
|---|---|---|
| 561,666 | Great Britain | May 30, 1944 |